Aug. 3, 1948.  J. E. NICKELL  2,446,486
ANIMAL TRAP
Filed March 21, 1945　　2 Sheets-Sheet 1
Fig. 1.
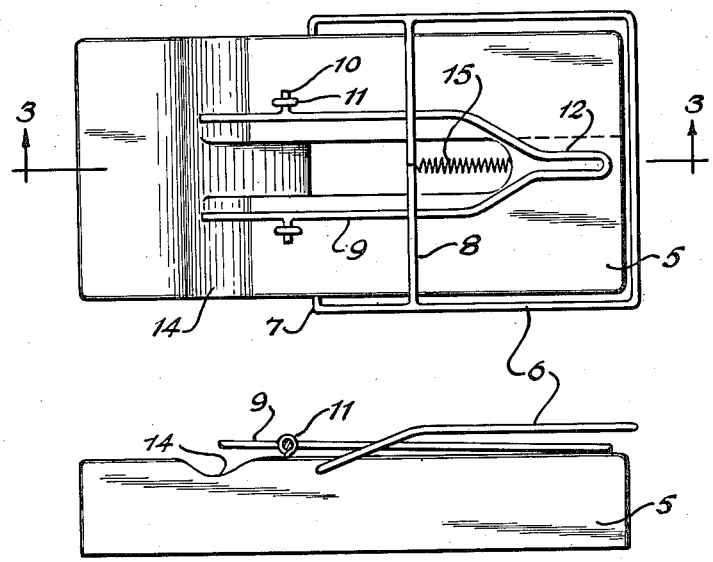
Fig. 2.
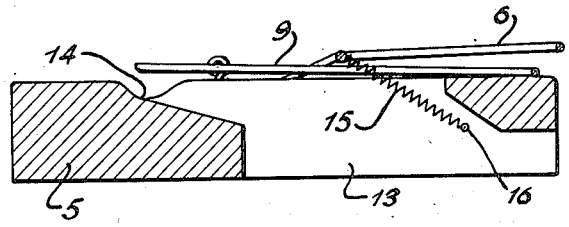
Fig. 3.
Inventor
John E. Nickell.
By Clarence A. O'Brien
and Harvey B. Jacobson
Attorneys Aug. 3, 1948.    J. E. NICKELL    2,446,486
ANIMAL TRAP Filed March 21, 1945    2 Sheets-Sheet 2

Inventor
John E. Nickell.

By Clarence A. O'Brien
and Harvey B. Jacobson
Attorneys

Patented Aug. 3, 1948

2,446,486

UNITED STATES PATENT OFFICE 2,446,486

ANIMAL TRAP

John E. Nickell, McFarland, Calif., assignor of forty per cent to James M. Yarbor, Delano, Calif.

Application March 21, 1945, Serial No. 583,864

1 Claim. (Cl. 43—81)

The present invention relates to new and useful improvements in animal traps and more particularly to traps adapted for catching rats and other rodents.

More specifically the invention comprises an animal trap of this character of the spring jaw type embodying a spring-actuated swinging jaw adapted to be released by the animal for striking the latter and clamping the animal against a supporting base.

An important object of the present invention is to provide novel releasing mechanism for the jaw and formed as a part of a bait holder for releasing the jaw by the action of the animal grabbing the bait.

A still further object is to provide a device of this character of simple and practical construction, which is strong and durable, efficient and reliable in operation, relatively inexpensive to manufacture and otherwise well adapted for the purposes for which the same is intended.

Other objects ad advantages reside in the details of construction and operation as more fully hereinafter described and claimed, reference being had to the accompanying drawings forming part hereof, wherein like numerals refer to like parts throughout, and in which:

Figure 1 is a top plan view showing the trap in released position.

Figure 2 is a side elevational view thereof.

Figure 3 is a longitudinal sectional view taken substantially on a line 3—3 of Figure 1.

Figure 4:
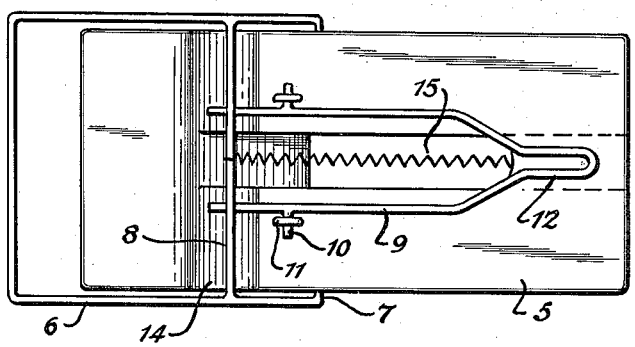
Figure 4 is a top plan view showing the trap in set position.

Referring now to the drawings in detail wherein for the purpose of illustration I have disclosed a preferred embodiment of the invention, the numeral 5 designates a base preferably constructed of wood or other suitable light weight material and of substantially rectangular form.

A substantially U-shaped jaw 6 has its end portions bent inwardly as indicated at 7 and projecting into openings in the sides of the base 5 for swingably supporting the jaw thereon. A cross bar 8 connects the legs of the jaw intermediate the ends thereof.

A combined trip device and bait holder 9 of generally U-shaped formation is formed adjacent its end portions with laterally extending trunnions 10 pivotally mounted in staples, screw eyes or the like 11 secured to the upper surface of the base.

The bight portion of the member 9 is bent to form a relatively narrow longitudinally extending projection 12 forming a bait holder and terminates in a position adjacent one end of the base 5.

Figure 5:
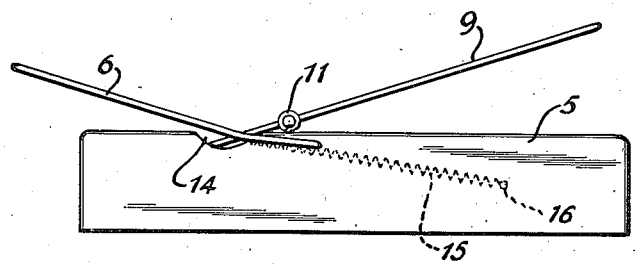
Figure 5 is a side elevational view thereof.

The base is formed with a longitudinally extending slot 13 extending entirely through the base from the top to bottom thereof and the upper surface of the base is formed with a transversely extending shallow groove 14 positioned under the rear or open end of the trip 9 and into which the rear ends of the trip 9 are adapted to enter when the trip and bait holder 12 is raised into its upper or set position as indicated in Figure 5 of the drawings.

A coil spring 15 connects the cross bar 8 of the jaw 6 and extends forwardly and downwardly in the slot 13 for attaching to the base by means of a pin or the like 16.

The legs of the jaw 6 are inclined from a point in the region of the cross bar 8 toward the pivoted ends 7 thereof so that the free end of the jaw will occupy a position substantially parallel to the upper surface of the base 5 and in close relation thereto for tightly clamping the animal against the base when the trap is sprung, the jaw being held in its closed position by the spring 15.

In setting the trap the jaw 6 is swung rearwardly from the position shown in Figures 1 to 3, inclusive, into the position as shown in Figures 4 and 5 whereby the cross bar 8 will engage the rear ends of the trip 9 and move the same downwardly into the groove 14, thus raising the front end of the trip and bait holder 12.

The pin or fastening device 16 for the spring 15 is positioned so that the spring will swing past and below the pivot of the jaw 6 in the manner as indicated in Figure 5 and the spring will thus hold the jaw in its open or set position.

When the animal approaches the bait in the bait holder 12 and attempts to obtain the bait by lowering the bait holder and the front end of the trip device 9, the rear ends thereof will raise the cross bar 8 until the spring 15 is moved past the center to the pivot of the jaw whereupon the spring will serve to snap the jaw forwardly for closing the same upon the animal.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though I have herein shown and described a preferred embodiment of my invention that the same is susceptible to certain changes fully comprehended by the spirit of the invention as herein described and the scope of the appended claim.

Having described the invention, what I claim is:

An animal trap comprising a base, a substantially U-shaped jaw having ends pivotally mounted in the sides of the base and swingable forwardly and rearwardly of the base into its closed and open positions, said jaw having an intermediate cross bar, spring means connected to the cross bar and operable to hold the jaw in its open position and to swing the jaw into its closed position, and an elongated trip member pivoted intermediate its ends on the base, one end of the trip member being engaged under the cross bar and adapted to release the jaw through the medium of an animal exerting a predetermined force on the other end of the member.

JOHN E. NICKELL.

REFERENCES CITED

The following references are of record in the file of this patent:

UNITED STATES PATENTS

| Number | Name | Date |
|---|---|---|
| 1,005,740 | Nebel | Oct. 10, 1911 |
| 1,452,087 | Mark et al. | Aug. 17, 1923 |
| 2,191,274 | Docken | Feb. 20, 1940 |

FOREIGN PATENTS

| Number | Country | Date |
|---|---|---|
| 101,760 | Great Britain | Oct. 19, 1916 |